(12) United States Patent
Perkins et al.

(10) Patent No.: US 9,751,609 B2
(45) Date of Patent: *Sep. 5, 2017

(54) DECOMPRESSION PANEL FOR USE IN AN AIRCRAFT

(71) Applicant: The Boeing Company, Seal Beach, CA (US)

(72) Inventors: Thomas Perkins, Renton, WA (US); Michael J. Olliges, Mill Creek, WA (US); Allan A. Loken, Kent, WA (US); Hannah Rebecca Arm, Renton, WA (US); Jeremy Ryan Glaze Tatum, Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,397

(22) Filed: Oct. 27, 2016

(65) Prior Publication Data

US 2017/0043856 A1 Feb. 16, 2017

Related U.S. Application Data

(63) Continuation of application No. 14/228,524, filed on Mar. 28, 2014, now Pat. No. 9,499,251.

(60) Provisional application No. 61/895,706, filed on Oct. 25, 2013.

(51) Int. Cl.
*B64C 1/00* (2006.01)
*B64C 1/06* (2006.01)
*B32B 3/06* (2006.01)
*B64C 1/18* (2006.01)
*B64F 5/10* (2017.01)

(52) U.S. Cl.
CPC ................ *B64C 1/069* (2013.01); *B32B 3/06* (2013.01); *B64C 1/18* (2013.01); *B64F 5/10* (2017.01); *B64C 2001/009* (2013.01); *Y10T 428/24777* (2015.01)

(58) Field of Classification Search
CPC .................................. B64C 1/069; B32B 3/06
See application file for complete search history.

(56) References Cited

U.S. PATENT DOCUMENTS

| | | |
|---|---|---|
| 1,081,195 A | 12/1913 | Austin |
| 1,978,642 A | 10/1934 | MacLean |
| 2,395,233 A | 2/1946 | Richardson |
| D153,487 S | 4/1949 | Adam |
| 2,859,841 A | 11/1958 | Reed, Jr. et al. |
| 2,925,050 A | 2/1960 | Candlin, Jr. et al. |
| 3,571,977 A | 3/1971 | Abeel |
| 4,033,247 A | 7/1977 | Murphy |
| 4,066,212 A | 1/1978 | Sonneville |

(Continued)

*Primary Examiner* — Richard G Davis
(74) *Attorney, Agent, or Firm* — Armstrong Teasdale LLP

(57) ABSTRACT

A method of installing and replacing a plurality of decompression panels into a sidewall assembly of an aircraft includes coupling a first decompression panel to at least one of a sidewall and a floor panel of the sidewall assembly. The method also includes inserting a tab of the first decompression panel into a slot of a second decompression panel. The slot is defined by a flange extending along a surface of the second decompression panel. The method further includes coupling the second decompression panel to at least one of a sidewall and a floor panel of the sidewall assembly.

19 Claims, 6 Drawing Sheets

(56) References Cited

U.S. PATENT DOCUMENTS

| | | | | |
|---|---|---|---|---|
| 4,133,852 | A | 1/1979 | DiNicolantonio et al. | |
| 4,353,503 | A | 10/1982 | Duchemin | |
| 4,390,152 | A * | 6/1983 | Jorgensen | B64C 1/18 137/513.3 |
| 4,432,514 | A | 2/1984 | Brandon | |
| 4,432,538 | A | 2/1984 | Sequin | |
| RE32,554 | E | 12/1987 | Murphy | |
| 4,728,235 | A | 3/1988 | Patti | |
| 4,819,548 | A | 4/1989 | Horstman | |
| 4,899,960 | A | 2/1990 | Hararat-Tehrani et al. | |
| 5,025,987 | A | 6/1991 | Kotecki et al. | |
| 5,046,686 | A | 9/1991 | Carla et al. | |
| 5,085,017 | A | 2/1992 | Hararat-Tehrani | |
| 5,118,053 | A | 6/1992 | Singh et al. | |
| 5,137,231 | A | 8/1992 | Boss | |
| 5,331,119 | A | 7/1994 | Leger et al. | |
| D351,903 | S | 10/1994 | Whitley, II | |
| D353,193 | S | 12/1994 | Porter | |
| D358,205 | S | 5/1995 | Ruhland | |
| 5,606,829 | A | 3/1997 | Hararat-Tehrani | |
| D390,948 | S | 2/1998 | Meyer | |
| D393,708 | S | 4/1998 | Assadi | |
| 5,792,230 | A | 8/1998 | Moore et al. | |
| D402,356 | S | 12/1998 | Hodge | |
| 5,871,178 | A | 2/1999 | Barnett et al. | |
| 6,029,933 | A | 2/2000 | Holman et al. | |
| 6,129,312 | A * | 10/2000 | Weber | B64C 1/18 244/118.5 |
| 6,129,856 | A | 10/2000 | Jung et al. | |
| 6,261,042 | B1 | 7/2001 | Pratt | |
| 6,264,141 | B1 | 7/2001 | Shim et al. | |
| 6,290,445 | B1 | 9/2001 | Duran et al. | |
| D456,066 | S | 4/2002 | Ching | |
| 6,435,455 | B1 * | 8/2002 | Holman | B64C 1/10 244/118.5 |
| 6,450,415 | B1 | 9/2002 | Kirchner et al. | |
| D466,605 | S | 12/2002 | Ziegler | |
| D469,889 | S | 2/2003 | O'Hagin | |
| 6,601,356 | B2 | 8/2003 | Snyder | |
| 6,702,230 | B2 | 3/2004 | Movsesian et al. | |
| 6,817,941 | B1 | 11/2004 | Gatov | |
| D504,172 | S | 4/2005 | O'Hagin | |
| D517,193 | S | 3/2006 | Calkins | |
| 7,021,855 | B2 | 4/2006 | Hardtke et al. | |
| 7,207,524 | B2 | 4/2007 | Puschmann et al. | |
| 7,234,894 | B1 | 6/2007 | Flury | |
| 7,303,800 | B2 | 12/2007 | Rogers | |
| D576,723 | S | 9/2008 | Achen | |
| D578,633 | S | 10/2008 | Schluter et al. | |
| D581,487 | S | 11/2008 | Wildfang | |
| D582,029 | S | 12/2008 | Achen | |
| D589,605 | S | 3/2009 | Reedy et al. | |
| D597,653 | S | 8/2009 | Calkins | |
| 7,568,659 | B2 | 8/2009 | Roques et al. | |
| D606,183 | S | 12/2009 | Rosenbohm | |
| D607,989 | S | 1/2010 | Llana Garcia | |
| D614,753 | S | 4/2010 | DeFelice | |
| D614,754 | S | 4/2010 | DeFelice et al. | |
| 7,997,533 | B2 | 8/2011 | Muller et al. | |
| 8,201,775 | B2 | 6/2012 | Treimer et al. | |
| 8,393,577 | B2 | 3/2013 | Roth et al. | |
| 8,397,352 | B2 | 3/2013 | Langediers et al. | |
| 8,460,419 | B1 | 6/2013 | Hobbs | |
| D693,756 | S | 11/2013 | Stevens | |
| 8,651,924 | B1 | 2/2014 | Jones et al. | |
| 8,696,418 | B1 * | 4/2014 | Griffin | B64D 13/00 454/76 |
| 8,714,483 | B2 | 5/2014 | Hoetzeldt et al. | |
| 8,777,537 | B2 | 7/2014 | Fritsch | |
| D718,434 | S | 11/2014 | Diamond | |
| 8,899,374 | B2 | 12/2014 | Tanaka et al. | |
| D723,675 | S | 3/2015 | Paskow | |
| D726,093 | S | 4/2015 | Perkins et al. | |
| 9,061,566 | B2 * | 6/2015 | Hoehn | F16B 5/0012 |
| 9,233,747 | B2 | 1/2016 | Perkins et al. | |
| 9,249,570 | B2 | 2/2016 | Jean | |
| 2003/0168553 | A1 | 9/2003 | Diehl et al. | |
| 2003/0222175 | A1 | 12/2003 | Movsesian et al. | |
| 2004/0172889 | A1 | 9/2004 | Eijkelenberg et al. | |
| 2004/0227311 | A1 | 11/2004 | Sanders | |
| 2005/0202692 | A1 | 9/2005 | Zeuner et al. | |
| 2006/0102571 | A1 | 5/2006 | Foy et al. | |
| 2006/0240765 | A1 | 10/2006 | Cheng | |
| 2008/0308705 | A1 | 12/2008 | Sharp et al. | |
| 2009/0008502 | A1 * | 1/2009 | Lynas | B64C 1/066 244/119 |
| 2009/0179110 | A1 | 7/2009 | Leyens | |
| 2010/0058691 | A1 * | 3/2010 | Mannion | B32B 5/18 52/309.3 |
| 2010/0096500 | A1 | 4/2010 | Benthien et al. | |
| 2010/0101176 | A1 | 4/2010 | Metham | |
| 2010/0187358 | A1 | 7/2010 | Voss et al. | |
| 2010/0275410 | A1 | 11/2010 | Chang | |
| 2010/0320318 | A1 | 12/2010 | Roth et al. | |
| 2011/0017742 | A1 * | 1/2011 | Sausen | B65D 11/188 220/324 |
| 2011/0041293 | A1 | 2/2011 | Langediers et al. | |
| 2012/0043421 | A1 | 2/2012 | Voss et al. | |
| 2012/0234973 | A1 | 9/2012 | Hoetzeldt et al. | |
| 2013/0075525 | A1 | 3/2013 | Roth | |
| 2013/0139374 | A1 | 6/2013 | Eilken et al. | |
| 2014/0082977 | A1 | 3/2014 | Pilon | |
| 2014/0325824 | A1 | 11/2014 | Pacini et al. | |
| 2015/0043965 | A1 | 2/2015 | Mao-Cheia | |
| 2015/0087217 | A1 | 3/2015 | Switzer et al. | |
| 2015/0115102 | A1 | 4/2015 | Perkins et al. | |
| 2015/0115103 | A1 | 4/2015 | Perkins et al. | |

* cited by examiner

DECOMPRESSION PANEL FOR USE IN AN AIRCRAFT

CROSS REFERENCE TO RELATED APPLICATIONS

This application is a continuation application of U.S. patent application Ser. No. 14/228,524, filed Mar. 28, 2014, which claims priority to U.S. Provisional Application No. 61/895,706 filed Oct. 25, 2013, both of which are hereby incorporated by reference in its entirety.

BACKGROUND

The field of the present disclosure relates generally to aircraft assemblies and, more specifically, to decompression panels for use in aircraft assemblies.

At least some known aircraft include several openings defined between a passenger compartment and adjacent compartments of an aircraft cabin. Such known openings serve a dual purpose. During normal operation, the openings define an air flow path that enables conditioned air to be circulated through the aircraft cabin. During a decompression event, the openings allow large quantities of air to flow therethrough to facilitate equalizing the pressure within the aircraft cabin.

In at least some known aircraft, the openings are covered with several panels including a grille and/or louvers. At least one known method of installing the panels in the aircraft cabin includes shingling the panels together. However, such method does not provide positive retention between adjacent panels nor positive retention between panels and interfacing airplane components. Without positive retention, passengers may deflect panel surfaces to access areas behind the panel. Moreover, the panels may migrate during flight and expose gaps in the cabin.

Another method of installing the panels includes using a spring-type clip that mates with a hook feature on an adjacent panel. The clip retains only a center portion of the panel, leaving much of the panel edge unsecured. Adhesive tape and/or security fasteners have also been employed to attach adjacent panels. However, in addition to being unsightly and detracting from the in-cabin experience of the passengers, such methods may be expensive and time consuming to implement and maintain.

BRIEF DESCRIPTION

In one aspect, a method of installing and replacing a plurality of decompression panels into a sidewall assembly of an aircraft is provided. The method includes coupling a first decompression panel to at least one of a sidewall and a floor panel of the sidewall assembly. The method also includes inserting a tab of the first decompression panel into a slot of a second decompression panel. The slot is defined by a flange extending along a surface of the second decompression panel. The method further includes coupling the second decompression panel to at least one of a sidewall and a floor panel of the sidewall assembly.

In another aspect, a method of securing and separating a first decompression panel of an aircraft sidewall assembly and a second decompression panel of the sidewall assembly is provided. The method includes deforming a flange on the second decompression panel and inserting a tab of the first decompression panel into a slot of the second decompression panel. The slot is defined by the flange extending along a surface of the second decompression panel. The method also includes releasing the flange to secure the tab within the slot.

In yet another aspect, an aircraft is provided. The aircraft includes a side wall, a floor panel, and a decompression panel coupled between the side wall and the floor panel. The decompression panel includes a body portion including a first end and a second end opposing the first end, a tab extending along the first end, and a flange extending from the body portion along the second end. At least a portion of the flange extends along a surface of the body portion such that a slot is defined between the portion of the flange and the surface of the body portion at the second end. The aircraft also includes a clamping device coupled to the decompression panel and at least one of the side wall and the floor panel. The clamping device is configured to secure the decompression panel.

DETAILED DESCRIPTION

The implementations described herein relate to a decompression panel for use in an aircraft assembly. More specifically, the decompression panel includes a recessed tab extending along a first side of the panel and a flange defining a slot near a second edge of the panel. The slot is configured to receive a tab of an adjacent decompression panel to form a secure coupling. The tab is arcuate such that the decompression panel maintains sufficient flexibility to slightly rotate for installation. Moreover, the coupling of the tab within the slot restricts access to an area behind the decompression panel by securing the upper and lower portions of the edges of the decompression panel.

Figure 1:
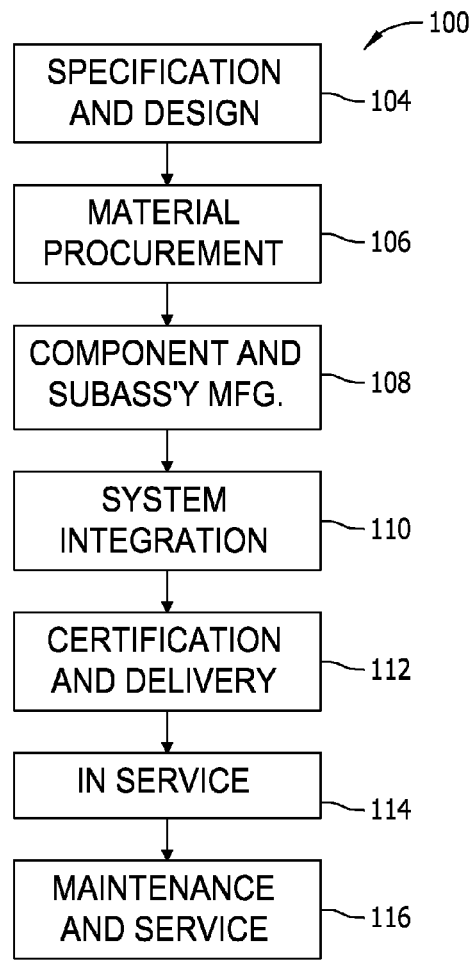
FIG. 1 is a flow diagram of an exemplary aircraft production and service methodology.
Figure 2:
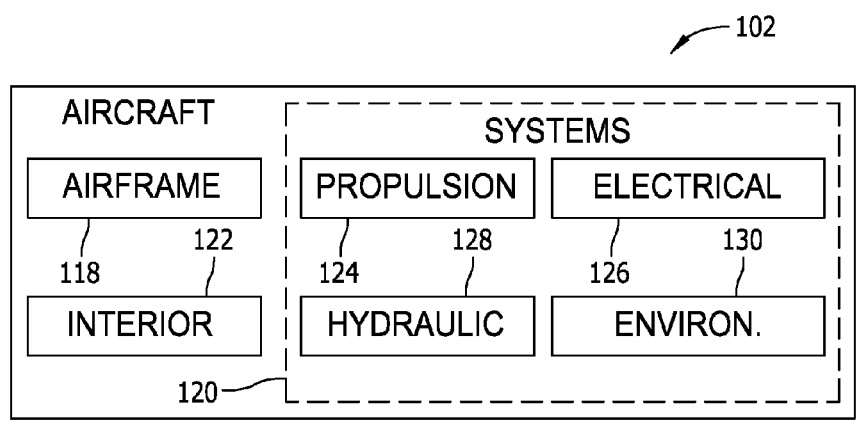
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
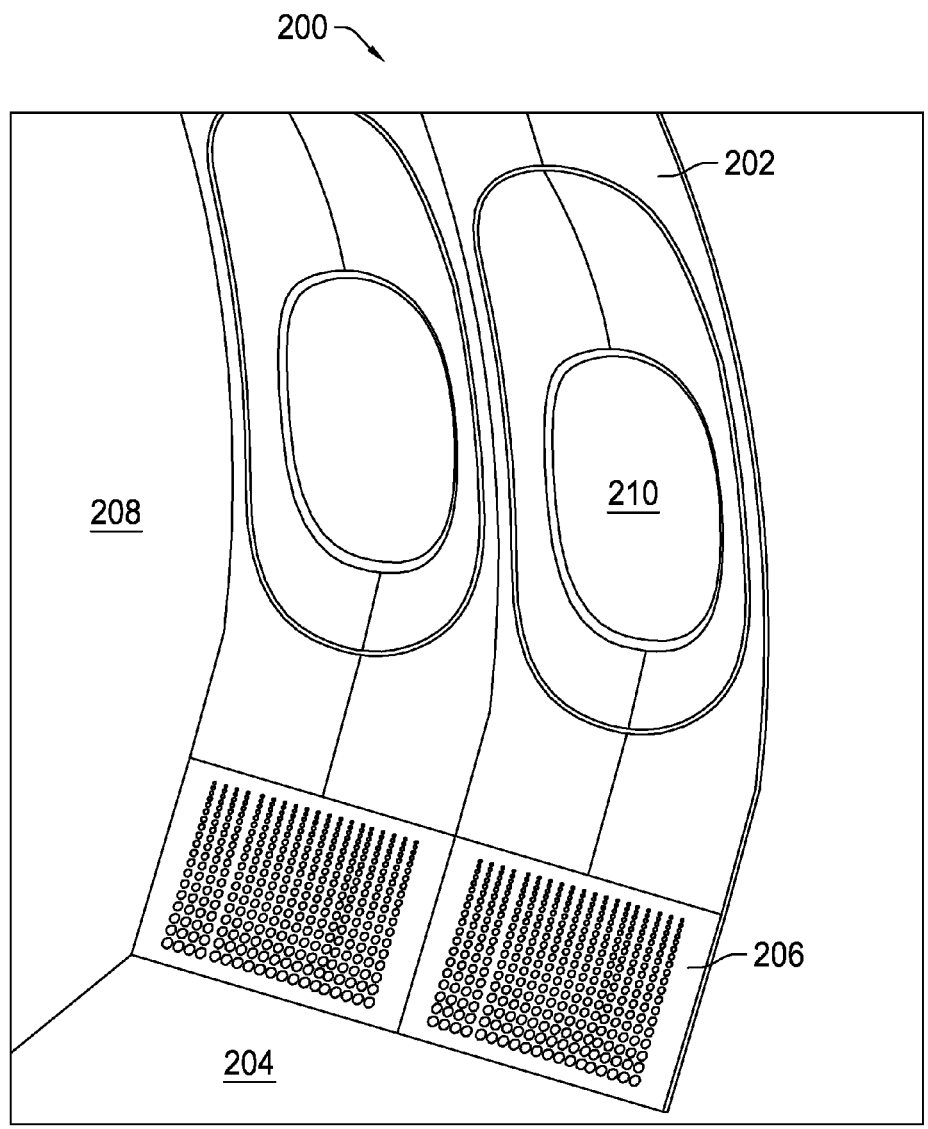
FIG. 3 is a perspective sectional view of an exemplary aircraft cabin.

FIG. 3 is a perspective sectional view of an exemplary aircraft cabin 200 that may be used in aircraft 102. In the exemplary implementation, aircraft cabin 200 includes a side wall 202, a floor panel 204, and decompression panels 206 coupled therebetween that at least partially define an interior 208 of aircraft cabin 200. Side wall 202 also includes a window opening 210 defined therein. In operation, decompression panels 206 facilitate circulating conditioned air through aircraft cabin 200 and/or facilitate equalizing the pressure in aircraft cabin 200 during a decompression event.

Figure 4:
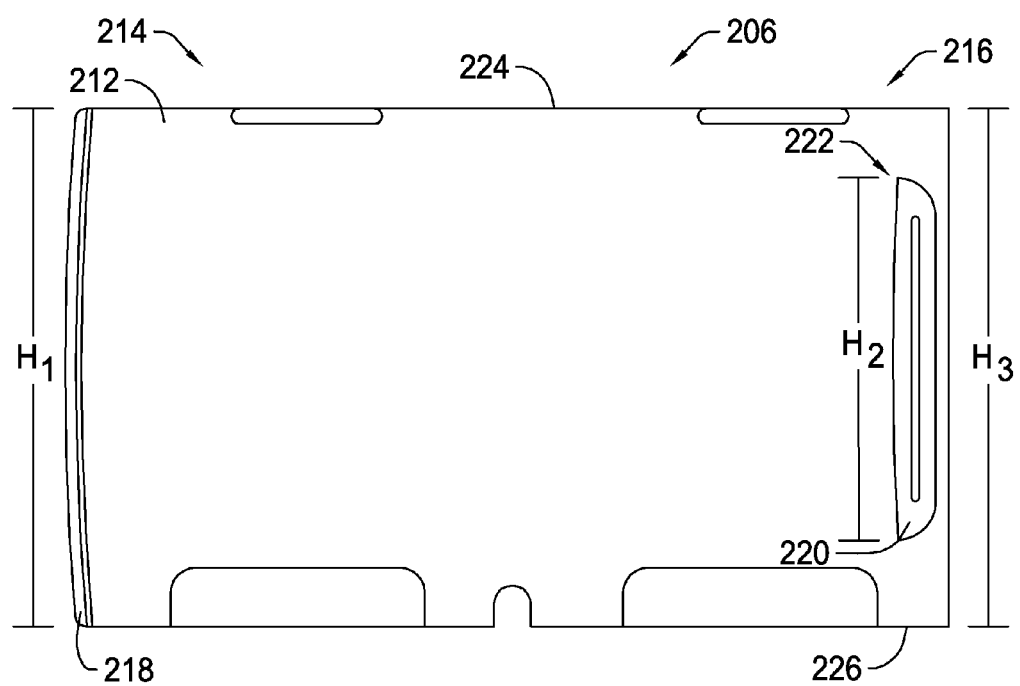
FIG. 4 is a backside view of an exemplary decompression panel that may be used in the aircraft cabin shown in FIG. 3.
Figure 5:
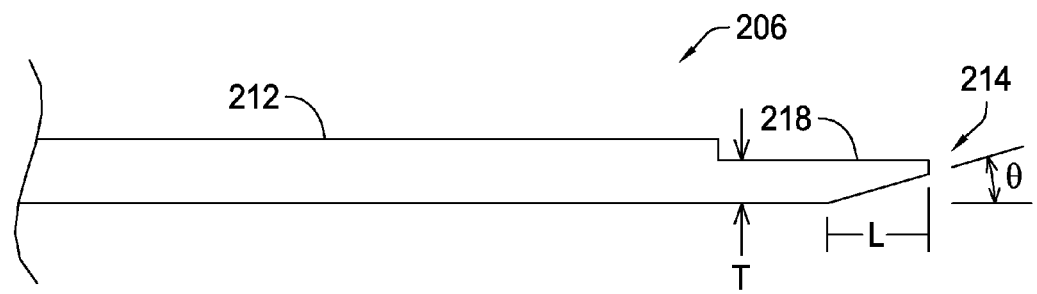
FIG. 5 is an enlarged top view of a portion of the decompression panel shown in FIG. 4 including a tab.
Figure 6:
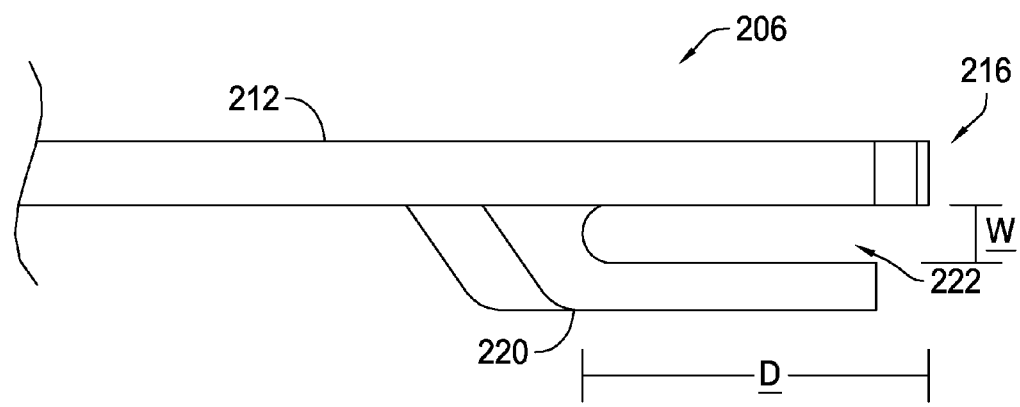
FIG. 6 is an enlarged top view of a portion of the decompression panel shown in FIG. 4 including a flange.
Figure 7:
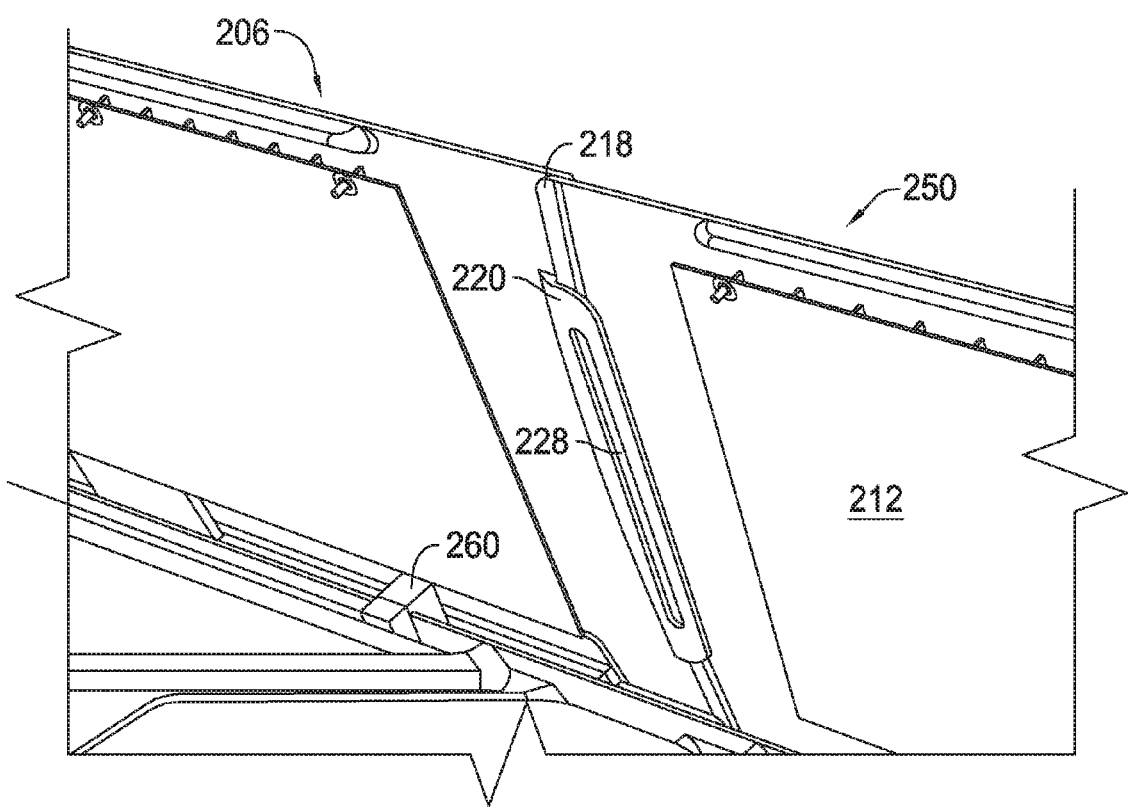
FIG. 7 is a perspective view of the decompression panel shown in FIG. 6 engaged with a second decompression panel.

FIG. 4 is a rear view of decompression panel 206 that may be used in aircraft cabin 200. FIG. 5 is an enlarged top view of a portion of decompression panel 206 including a tab 218. FIG. 6 is an enlarged top view of a portion of decompression panel 206 including a flange 220. FIG. 7 is a perspective view of decompression panel 206 engaged with a second decompression panel.

In the exemplary implementation, decompression panel 206 includes a body portion 212 having a first end 214 and a second end 216. Decompression panel 206 also includes a tab 218 that extends along first end 214 and a flange 220 that extends from body portion 212 adjacent second end 216 to define a slot 222.

Decompression panel 206 may be fabricated from any suitable material. Exemplary materials include, but are not limited to, thermoplastic polymeric materials. As such, decompression panel 206 may be fabricated in a single die injection molding process.

In the exemplary implementation, tab 218 extends an entire height $H_1$ of first end 214 such that tab 218 includes a height that is substantially similar to height $H_1$ of first end 214. Tab 218 has an arcuate shape, curving outwardly to accommodate for build variations and to enable engagement and/or disengagement of decompression panel 206 with a second, adjacent decompression panel 250. More specifically, the curved mating edge of tab 218 provides allowance for variations and differences, in what is primarily the vertically oriented direction of angular alignment along height $H_1$, among adjacent decompression panels 206. Furthermore, tab 218 includes a tapered cross section such that a thickness T of tab 218 decreases at an angle $\Theta$ along a length L. The arcuate shape of tab 218, along with the tapered cross section, provides first end 214 with sufficient flexibility such that it can be slightly rotated and removed from slot 222. Tab 218 is recessed such that when decompression panel 206 is coupled to an adjacent second decompression panel 250, recessed first end 214 of decompression panel 206 slides behind second decompression panel 250 so as to not be visible from within interior 208 of aircraft cabin 200 (shown in FIG. 3).

In the exemplary implementation, flange 220 has a height $H_2$ and extends at least one-half of a height $H_3$ of second end 216. Furthermore, flange 220 is oriented approximately mid-way along second end 216 such that flange 220 is evenly spaced between an upper edge 224 and a lower edge 226 of decompression panel 206. Flange 220 protrudes a suitable distance away from body portion 212 in an axial direction to define slot 222. For example, in the exemplary implementation, slot 222 has a width W that related to thickness T by a ratio of approximately 1.0 to 1.2. Slot 222 is configured to receive tab 218 of an adjacent decompression panel and provide a secure coupling between them. An engagement depth D between tab 218 and flange 220 is configured to enable panels 206 and 250 to be securely locked together when engaged, but also to enable build tolerance variation for each panel in a horizontal direction. Because the engagement between tab 218 and flange 220 extends along at least half of second end $H_2$, a more secure coupling is created, restricting access to behind the decompression panel by securing upper and lower edges of the decompression panel.

During installation, tab 218 is inserted into the slot of second decompression panel 250. In some implementations, tab 218 is recessed, forming a flush fit between decompression panel 206 and second decompression panel 250 so as to provide a pleasing aesthetic appearance to passengers (not shown) seated in aircraft cabin 200 (shown in FIG. 3). In some implementations, a securing or clamping device 260 may be used in combination with tab 218 and flange 220 to further secure decompression panel 206 within aircraft cabin 200. In one implementation, when clamping device 260 is engaged with decompression panel 206, decompression panel 206 and second decompression panel 250 are secured together with sufficient rigidity to prevent rotation of decompression panel 206 and removal tab 218 from slot 222. Upon clamping device 260 being disengaged, decompression panel 206 and second decompression panel 250 may be rotated enough to remove tab 218 from slot 222. Moreover, flange 220 includes a channel feature 228, such that when clamp 260 is disengaged, flange 220 is deformable to allow disengagement of arcuate tab 218 from slot 222. In the exemplary implementation, channel feature 228 is shown as a rounded rectangular slot, however any alternate profile is also considered that would provide flange 220 with sufficient flexibility during disengagement of tab 218.

Figure 8:
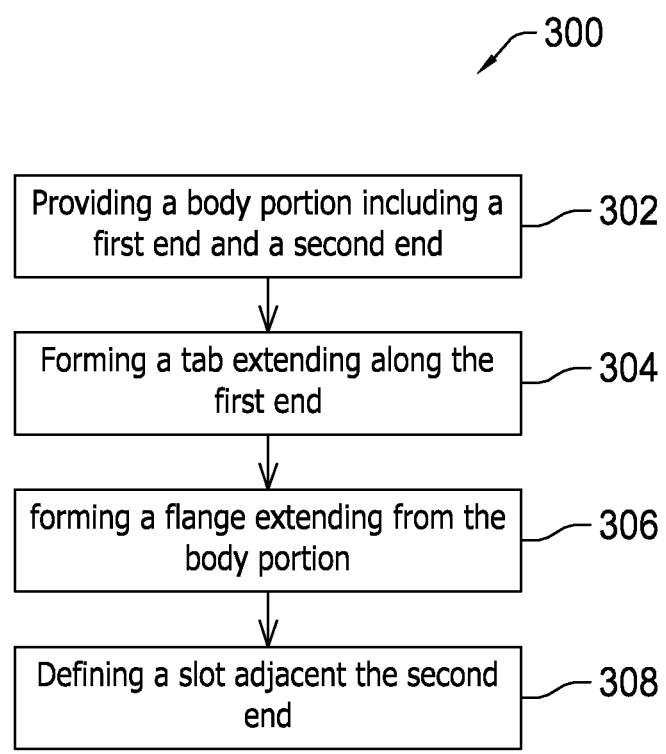
FIG. 8 is a schematic flow diagram of a method of forming the decompression panel shown in FIG. 6.

FIG. 8 is a schematic flow diagram of a method 300 of forming a decompression panel, such as decompression panel 206 (shown in FIG. 6). Method 300 includes providing 302 a body portion, such as body portion 212 (shown in FIG. 6) that includes a first end, such as first end 214 (shown in FIG. 6) and an opposing second end, such as second end 216 (shown in FIG. 6). Method 300 also includes forming 304 a tab, such as tab 218 (shown in FIG. 6), that extends along the first end, wherein the tab is formed 304 such that the tab extends substantially an entire height of the first end. Furthermore, a flange, such as flange 220 (shown in FIG. 6), is formed 306 such that the flange extends from the body portion. Method 300 further includes defining 308 a slot, such as slot 222 (shown in FIG. 6), adjacent the second end, wherein the slot is at least partially defined by the flange. The flange is formed 306 such that the flange includes a height that is at least half of a height of the second end and such that the flange is evenly spaced between an upper edge and a lower edge of the decompression panel. The slot is defined 308 such that the slot includes a width that is related to the thickness of the tab by a ratio of approximately 1.0 to 1.2.

The decompression panel described herein includes a recessed tab extending along an entire first side edge of the panel and a flange defining a slot near a second edge of the panel that facilitate at least one of (a) increasing a strength of an engagement between the decompression panel and an adjacent decompression panel; (b) maintaining flexibility of the decompression panel for installation; and (c) restricting access to behind the decompression panel by securing upper and lower portions of the edges of the decompression panel.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of installing and replacing a plurality of decompression panels into a sidewall assembly of an aircraft, said method comprising:
   coupling a first decompression panel to at least one of a sidewall and a floor panel of the sidewall assembly;
   inserting a tab of the first decompression panel into a slot of a second decompression panel, wherein the tab is arcuate to facilitate installation of the first decompression panel, wherein the slot is defined by a flange extending along a surface of the second decompression panel; and
   coupling the second decompression panel to at least one of a sidewall and a floor panel of the sidewall assembly.

2. The method in accordance with claim 1, wherein inserting the tab comprises deforming the flange to enable the slot to receive the tab.

3. The method in accordance with claim 2, wherein deforming the flange comprises deforming the flange along a channel formed through the flange, wherein the channel facilitates deformation of the flange.

4. The method in accordance with claim 3, further comprising returning the flange to a pre-deformed configuration to secure the tab within the slot.

5. The method in accordance with claim 1, further comprising coupling a clamping device to the first decompression panel to secure the first decompression panel to the second decompression panel.

6. The method in accordance with claim 5, wherein coupling the clamping device comprises coupling the clamping device to the first decompression panel and the floor panel.

7. The method in accordance with claim 1, further comprising removing the first decompression panel from the second decompression panel.

8. The method in accordance with claim 7, wherein removing the first decompression panel from the second decompression panel comprises removing the tab from within the slot.

9. The method in accordance with claim 8, wherein removing the tab from within the slot comprises rotating the tab of the first decompression panel.

10. The method in accordance with claim 8, wherein removing the tab from within the slot comprises deforming the flange to enlarge the slot.

11. The method in accordance with claim 1, wherein the first decompression panel and the second decompression panel are coupled such that that a cabin-facing surface of the first decompression panel is flush with a cabin-facing surface of the second decompression panel.

12. A method of securing and separating a first decompression panel of an aircraft sidewall assembly and a second decompression panel of the sidewall assembly, said method comprising:
    deforming a flange on the second decompression panel, wherein deforming the flange comprises deforming the flange along a channel formed through the flange, wherein the channel facilitates deformation of the flange;
    inserting a tab of the first decompression panel into a slot of the second decompression panel, wherein the slot is defined by the flange extending along a surface of the second decompression panel; and
    releasing the flange to secure the tab within the slot.

13. The method in accordance with claim 12 further comprising coupling a clamping device to the first decompression panel to secure the first decompression panel to the second decompression panel.

14. The method in accordance with claim 12, wherein said body portion further comprises an upper edge and an opposing lower edge, said flange being evenly spaced between said upper and said lower edges.

15. The method in accordance with claim 12, further comprising removing the first decompression panel from the second decompression panel.

16. The method in accordance with claim 15, wherein removing the first decompression panel from the second decompression panel comprises removing the tab from within the slot.

17. The method in accordance with claim 16, wherein removing the tab from within the slot comprises rotating the tab of the first decompression panel.

18. The method in accordance with claim 16, wherein removing the tab from within the slot comprises rotating the flange to enlarge the slot.

19. An aircraft comprising:
a side wall;
a floor panel;
a decompression panel coupled between said side wall and said floor panel, said decompression panel comprising:
   a body portion comprising a first end and a second end opposing said first end;
   a tab extending along said first end, wherein said tab is arcuate to facilitate installation of said decompression panel; and
   a flange extending from said body portion along said second end, at least a portion of said flange extending along a surface of said body portion such that a slot is defined between said portion of said flange and said surface of said body portion at said second end; and
a clamping device coupled to said decompression panel and at least one of said side wall and said floor panel, said clamping device configured to secure said decompression panel.

* * * * *